United States Patent
Mulqueen et al.

(10) Patent No.: US 10,719,994 B2
(45) Date of Patent: Jul. 21, 2020

(54) THREE-DIMENSIONAL SUBJECT COMPARISON WITH EFFICIENT PROCESSING

(71) Applicant: Intel Corporation, Santa Clara, CA (US)

(72) Inventors: Kieran Mulqueen, Maynooth (IE); Dermot Gallagher, Derry (GB); Noel M. Kennedy, Castleknock (IE); William Clifford, Cork (IE); Kerry P. Hartnett, Kildare (IE)

(73) Assignee: Intel Corporation, Santa Clara, CA (US)

( * ) Notice: Subject to any disclaimer, the term of this patent is extended or adjusted under 35 U.S.C. 154(b) by 617 days.

(21) Appl. No.: 15/086,846

(22) Filed: Mar. 31, 2016

(65) Prior Publication Data

US 2017/0287229 A1 Oct. 5, 2017

(51) Int. Cl.
*G06T 19/20* (2011.01)
*G06T 17/10* (2006.01)
*G06T 17/20* (2006.01)

(52) U.S. Cl.
CPC .......... *G06T 19/20* (2013.01); *G06T 17/10* (2013.01); *G06T 17/20* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 9,036,898 B1* | 5/2015 | Beeler | G06T 19/20 382/154 |
| 2016/0071318 A1* | 3/2016 | Lee | G06K 9/4609 345/419 |
| 2016/0314616 A1* | 10/2016 | Su | G06T 7/90 |
| 2017/0090460 A1* | 3/2017 | Andrew | B29C 64/386 |
| 2017/0181817 A1* | 6/2017 | Lior | A61C 11/00 |

* cited by examiner

*Primary Examiner* — Hilina K Demeter
(74) *Attorney, Agent, or Firm* — Schwegman Lundberg & Woessner, P.A.

(57) ABSTRACT

An actual subject and a computed three-dimensional (3D) model of the subject are compared by a computing platform. Captured geometry of the actual subject, and a 3D model of the subject are accessed. A first comparison result representing a difference between coarse representations of the captured geometry and of the 3D model is computed. Target portions of the first comparison result that exceed a threshold are determined. A second comparison result representing a difference between fine representations of the captured geometry and the 3D model is computed for only those portions of the captured geometry and the 3D model that correspond to the target portions.

25 Claims, 12 Drawing Sheets

THREE-DIMENSIONAL SUBJECT COMPARISON WITH EFFICIENT PROCESSING

TECHNICAL FIELD

Embodiments described herein generally relate to information processing, three-dimensional modeling, and captured-image analysis utilizing computing systems. More particularly, the embodiments relate to automated detection of differences between three-dimensional models and real-world manifestations of the modeled subjects.

BACKGROUND

Three-dimensional (3D) modelling is used to create and evaluate designs of subjects prior to their construction or manufacture. Subjects in the present context include buildings, vehicles or other things having designed interior or exterior spaces. Subjects may also include other architectural works, equipment, and other items of manufacture.

In the construction industry, for instance, building information modelling (BIM) is a field in which real-world subjects are measured to be compared against their 3D models. 3D scanning is used to digitally capture the geometric details about the subject in the real world. The captured 3D geometry may be compared against the 3D model upon which the construction of the subject was based. This comparison produces an assessment of the adherence of the actual construction to the design model, and identifies any notable differences.

Large constructions, such as factories, ships, and the like, particularly those that are designed with specific architectural and layout details that are to be strictly adhered to, present particular challenges for automated subject comparison. Notably, the massive size and number of details in the captured 3D scans and the 3D models present a challenging computational burden. Today's systems generally capture the real-life geometry of subjects, and perform the comparison processing at run time on a computing system, which may take on the order or minutes or hours to produce a comparison result.

A solution is needed to improve the computational efficiency so that comparisons between models and their real-world counterparts may be performed in, or near, real time, in the field.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Aspects of the embodiments are directed to comparison of an actual subject and a computed three-dimensional (3D) model of the subject. Subjects in the present context include buildings, vehicles or other things having designed interior or exterior spaces. Examples of buildings include homes, office buildings, factories, laboratories, educational institutions, restaurants, museums, auditoriums, stadiums, airports, and other public or private spaces. Examples of vehicles include ships, aircraft, spacecraft, rail cars, and personal vehicles. Subjects may also include other architectural works, equipment, and other items of manufacture. Embodiments described herein implement efficient computing techniques, and in some applications may deliver a real-time determination and visualization of the differences of what was designed against what was built.

Figure 1:
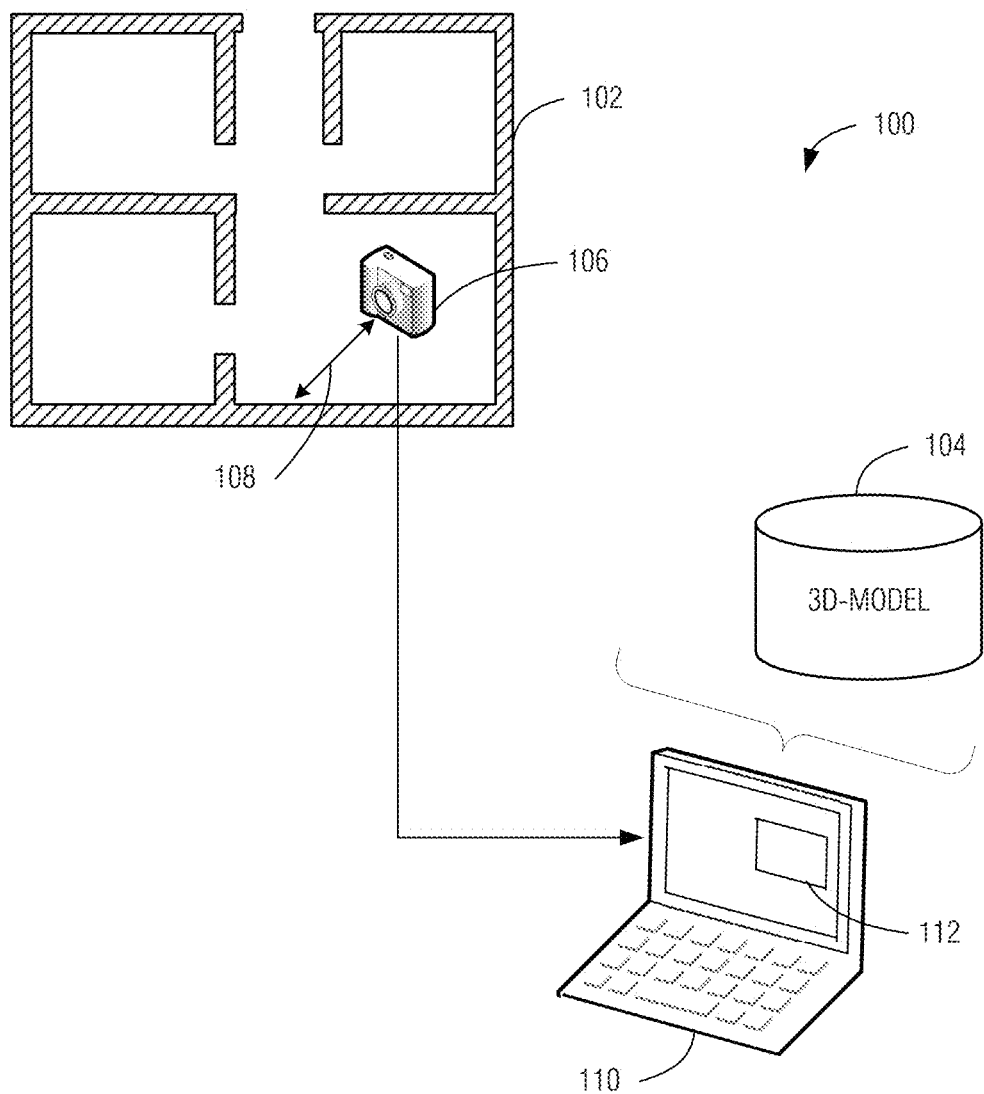
FIG. 1 is a high-level diagram illustrating an example arrangement of a comparison system according to an embodiment.

FIG. 1 is a high-level diagram illustrating an example arrangement of a comparison system according to an embodiment. As depicted, system 100 is arranged to compare measurements of actual subject 102 (in this example, an interior space), and 3D model 104 representing subject 102. A 3D capture device 106 is configured to capture scan surfaces and measure distance 108. 3D capture device 106 may be a camera with 3D scanning capability utilizing laser ranging, stereoscopic vision, or other suitable technology. In general, the output from 3D capture device 106 includes a point cloud of measured distances within the field of view of the 3D capture device 106. In a related embodiment, 3D capture device 106 may include an image-capture device, such as a digital camera, and the captured images may be overlaid, or otherwise mapped to, the 3D distance measurements.

Computing platform 110 is a special-purpose machine that may be configured based on a general-purpose computing device, such as a personal computer (PC) that may be portable or non-portable, or a tablet, smartphone, or other portable computing device having a suitable form-factor. Computing platform 110 may be one physical machine, or may be distributed among multiple physical machines, such as by role or function, or by process thread in the case of a cloud computing distributed model. In various embodiments, aspects of the embodiments may be configured to run in virtual machines that in turn are executed on one or more physical machines. It will be understood by persons of skill in the art that features of the invention may be realized by a variety of different suitable machine implementations.

Computing platform 110 is configured as a special-purpose machine by program instructions that, when executed, cause computing platform 110 to implement a series of engines that each perform specific functionality individually, and in coordination with other engines. In an embodiment, 3D model 104 is stored locally on computing platform 110; whereas in another type of embodiment 3D model 104 is accessed remotely from its storage location, which may be a remote server communicatively coupled to computing platform 110, for example In a related embodiment, computing platform 110 may perform certain information-processing operations, such as interfacing with data capture device 106, executing a graphical user interface to facilitate input and output from/to a user, and some comparison operations, while other processing tasks, such as 3D model preprocessing (discussed below in detail), fine-resolution processing, etc., are performed remotely on a server. In another related embodiment, system 100 is implemented entirely on a local device.

In an embodiment, data capture device 106 is mechanically incorporated with computing platform 110. In a related embodiment, data capture device is separately housed, but communicatively coupled with computing platform 110 via wired or wireless link.

Operation of computing platform 110 produces output 112, which may be displayed via a GUI. In the example of a BIM application, output 112 may include a report detailing specific differences between the as-designed 3D model 104, and the actual constructed subject 102.

Figure 2:
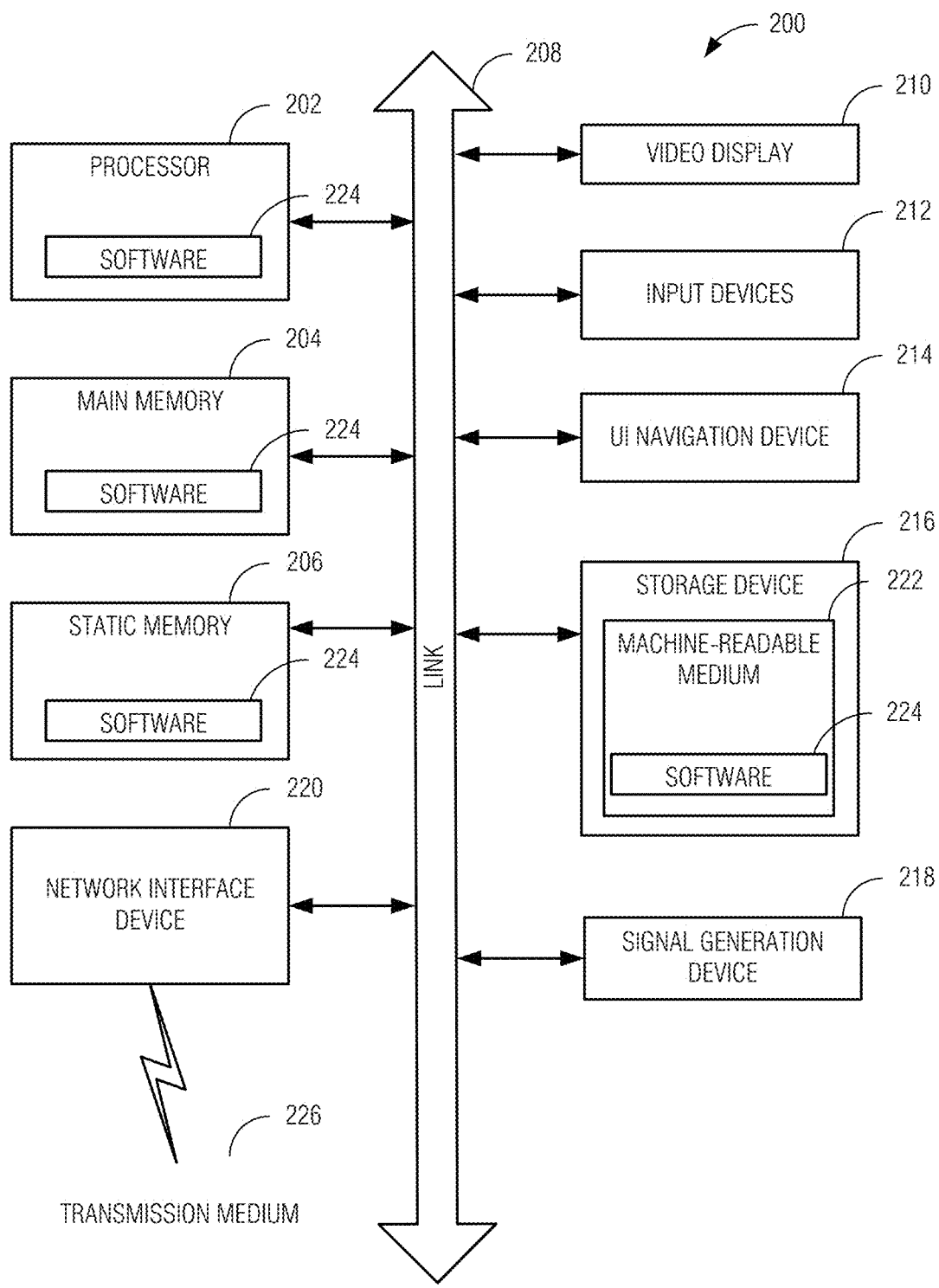
FIG. 2 is a block diagram illustrating an exemplary system architecture of a processor-based computing device according to an embodiment.

FIG. 2 is a block diagram illustrating a computing platform in the example form of a general-purpose machine. In certain embodiments, programming of the computing platform 200 according to one or more particular algorithms produces a special-purpose machine upon execution of that programming In a networked deployment, the computing platform 200 may operate in the capacity of either a server or a client machine in server-client network environments, or it may act as a peer machine in peer-to-peer (or distributed) network environments. Computing platform 200, or some portions thereof, may represent an example architecture of computing platform 106 or external computing platform 110 according to one type of embodiment.

Example computing platform 200 includes at least one processor 202 (e.g., a central processing unit (CPU), a graphics processing unit (GPU) or both, processor cores, compute nodes, etc.), a main memory 204 and a static memory 206, which communicate with each other via a link 208 (e.g., bus). The computing platform 200 may further include a video display unit 210, input devices 212 (e.g., a keyboard, data capture device, microphone), and a user interface (UI) navigation device 214 (e.g., mouse, touchscreen). The computing platform 200 may additionally include a storage device 216 (e.g., a drive unit), a signal generation device 218 (e.g., a speaker), and a network interface device (NID) 220.

The storage device 216 includes a machine-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, and/or within the processor 202 during execution thereof by the computing platform 200, with the main memory 204, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

NID 220 according to various embodiments may take any suitable form factor. In one such embodiment, NID 220 is in the form of a network interface card (NIC) that interfaces with processor 202 via link 208. In one example, link 208 includes a PCI Express (PCIe) bus, including a slot into which the NIC form-factor may removably engage. In another embodiment, NID 220 is a network interface circuit laid out on a motherboard together with local link circuitry, processor interface circuitry, other input/output circuitry, memory circuitry, storage device and peripheral controller circuitry, and the like. In another embodiment, NID 220 is a peripheral that interfaces with link 208 via a peripheral input/output port such as a universal serial bus (USB) port. NID 220 transmits and receives data over transmission medium 226, which may be wired or wireless (e.g., radio frequency, infra-red or visible light spectra, etc.), fiber optics, or the like.

Figure 3:
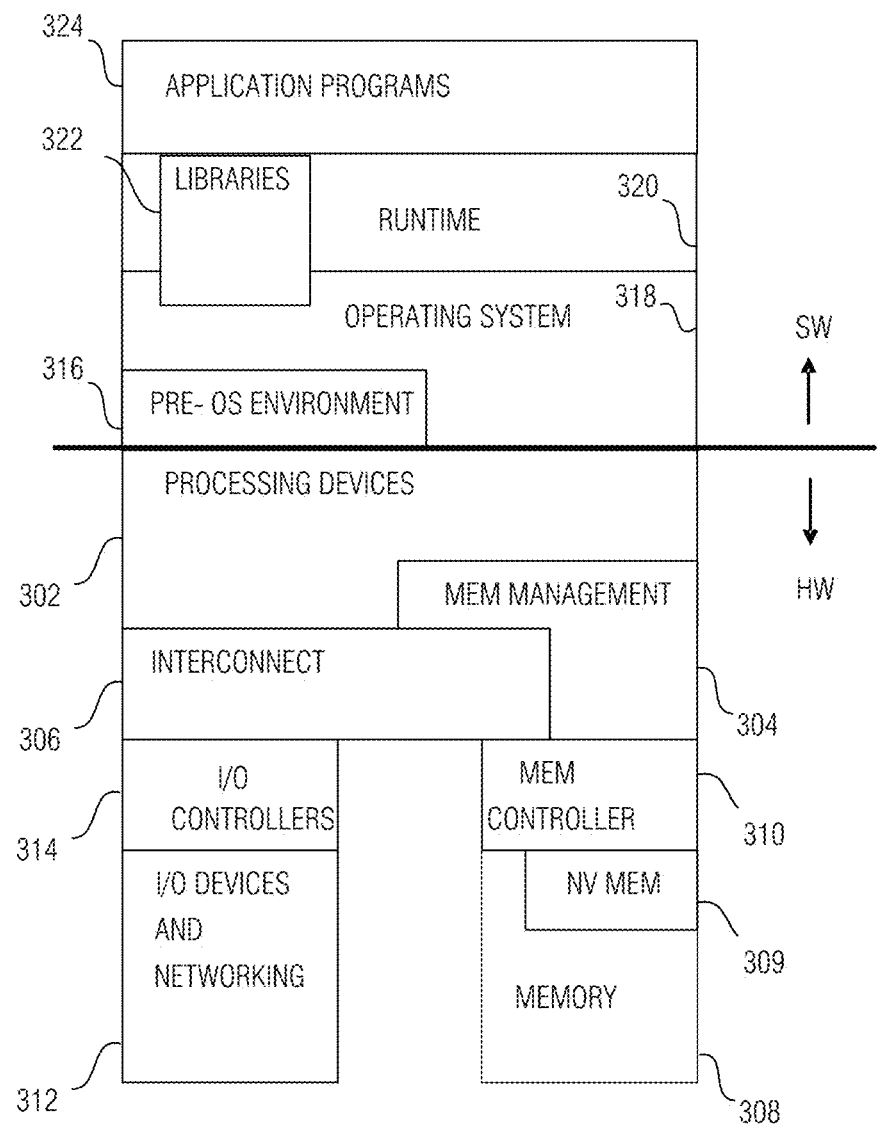
FIG. 3 is a diagram illustrating an exemplary hardware and software architecture of a computing device such as the one depicted in FIG. 2, in which various interfaces between hardware components and software components are shown.

FIG. 3 is a diagram illustrating an exemplary hardware and software architecture of a computing device such as the one depicted in FIG. 2, in which various interfaces between hardware components and software components are shown. As indicated by HW, hardware components are represented below the divider line, whereas software components denoted by SW reside above the divider line. On the hardware side, processing devices 302 (which may include one or more microprocessors, digital signal processors, etc., each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

Interconnect 306 includes a backplane such as memory, data, and control lines, as well as the interface with input/output devices, e.g., PCI, USB, etc. Memory 308 (e.g., dynamic random access memory—DRAM) and non-volatile memory 309 such as flash memory (e.g., electrically-erasable read-only memory—EEPROM, NAND Flash, NOR Flash, etc.) are interfaced with memory management device 304 and interconnect 306 via memory controller 310. This architecture may support direct memory access (DMA) by peripherals in one type of embodiment. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 312, which interface with interconnect 306 via corresponding I/O controllers 314.

On the software side, a pre-operating system (pre-OS) environment 316, which is executed at initial system start-up and is responsible for initiating the boot-up of the operating system. One traditional example of pre-OS environment 316 is a system basic input/output system (BIOS). In present-day systems, a unified extensible firmware interface (UEFI) is implemented. Pre-OS environment 316, is responsible for initiating the launching of the operating system, but also provides an execution environment for embedded applications according to certain aspects of the invention.

Operating system (OS) 318 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 318 provides device drivers, and a variety of common services such as those that facilitate interfacing with peripherals and networking, that provide abstraction for application programs so that the applications do not need to be responsible for handling the details of such common operations. Operating system 318 additionally provides a graphical user interface (GUI) engine that facilitates interaction with the user via peripheral devices such as a monitor, keyboard, mouse, microphone, video camera, touchscreen, and the like.

Runtime system 320 implements portions of an execution model, including such operations as putting parameters onto the stack before a function call, the behavior of disk input/output (I/O), and parallel execution-related behaviors. Runtime system 320 may also perform support services such as type checking, debugging, or code generation and optimization.

Libraries 322 include collections of program functions that provide further abstraction for application programs. These include shared libraries, dynamic linked libraries (DLLs), for example. Libraries 322 may be integral to the operating system 318, runtime system 320, or may be added-on features, or even remotely-hosted. Libraries 322 define an application program interface (API) through which a variety of function calls may be made by application programs 324 to invoke the services provided by the operating system 318. Application programs 324 are those programs that perform useful tasks for users, beyond the tasks performed by lower-level system programs that coordinate the basis operability of the computing device itself.

Figure 4:
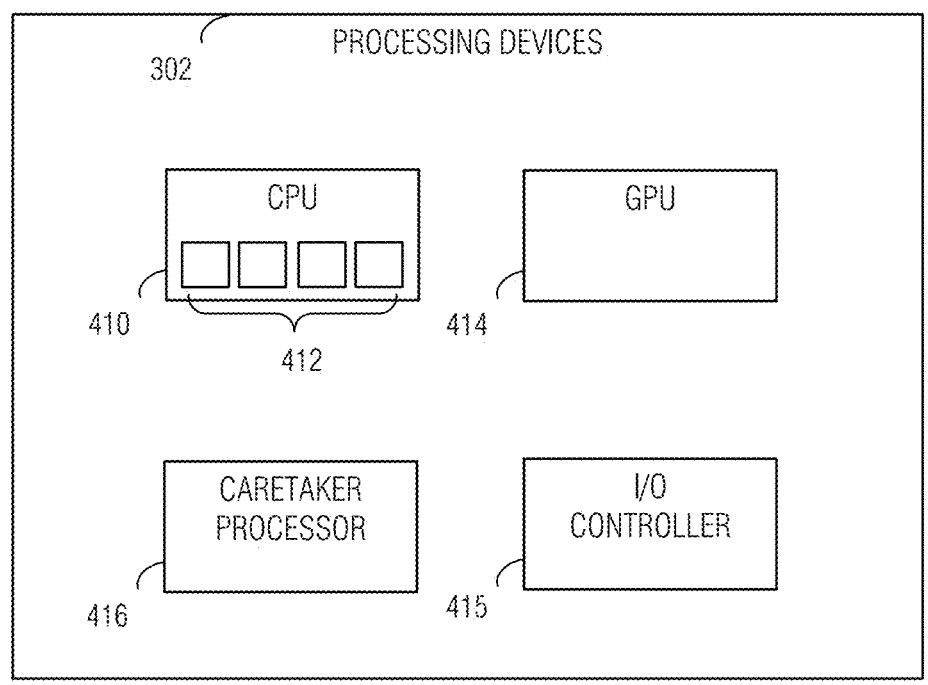
FIG. 4 is a block diagram illustrating examples of processing devices that may be implemented on a computing platform, such as the computing platform described with reference to FIGS. 2-3, according to an embodiment.

FIG. 4 is a block diagram illustrating processing devices 302 according to one type of embodiment. One, or a combination, of these devices may constitute processor 202 in one type of embodiment. CPU 410 may contain one or more processing cores 412, each of which has one or more arithmetic logic units (ALU), instruction fetch unit, instruction decode unit, control unit, registers, data stack pointer, program counter, and other essential components according to the particular architecture of the processor. As an illustrative example, CPU 410 may be an x86-type of processor. Processing devices 302 may also include a graphics processing unit (GPU) 414. In these embodiments, GPU 414 may be a specialized co-processor that offloads certain computationally-intensive operations, particularly those associated with graphics rendering, from CPU 410. Notably, CPU 410 and GPU 414 generally work collaboratively, sharing access to memory resources, I/O channels, etc.

Processing devices 302 may also include caretaker processor 416 in one type of embodiment. Caretaker processor 416 generally does not participate in the processing work to carry out software code as CPU 410 and GPU 414 do. In one type of embodiment, caretaker processor 416 does not share memory space with CPU 410 and GPU 414, and is therefore not arranged to execute operating system or application programs. Instead, caretaker processor 416 may execute dedicated firmware that supports the technical workings of CPU 410, GPU 414, and other components of the computing platform. In one type of embodiment, caretaker processor is implemented as a microcontroller device, which may be physically present on the same integrated circuit die as CPU 410, or may be present on a distinct integrated circuit die. Caretaker processor 416 may also include a dedicated set of I/O facilities to enable it to communicate with external entities. In one type of embodiment, caretaker processor 416 is implemented using a manageability engine (ME) or platform security processor (PSP). Input/output (I/O) controller 415 coordinates information flow between the various processing devices 410, 414, 416, as well as with external circuitry, such as a system interconnect.

Examples, as described herein, may include, or may operate on, logic or a number of circuits, components, engines, or modules, which for the sake of consistency are termed engines, although it will be understood that these terms may be used interchangeably. Engines may be hardware, software, or firmware communicatively coupled to one or more processors in order to carry out the operations described herein. Being ultimately implemented using hardware, engines are tangible entities capable of performing specified operations and may be configured or arranged in a certain manner In an example, circuits may be arranged (e.g., internally or with respect to external entities such as other circuits) in a specified manner as an engine. In an example, the whole or part of one or more computing platforms (e.g., a standalone, client or server computing platform) or one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which engines are temporarily configured, each of the engines need not be instantiated at any one moment in time. For example, where the engines comprise a general-purpose hardware processor configured using software; the general-purpose hardware processor may be configured as respective different engines at different times. Software may accordingly configure a hardware processor, for example, to constitute a particular engine at one instance of time and to constitute a different engine at a different instance of time.

Figure 5:
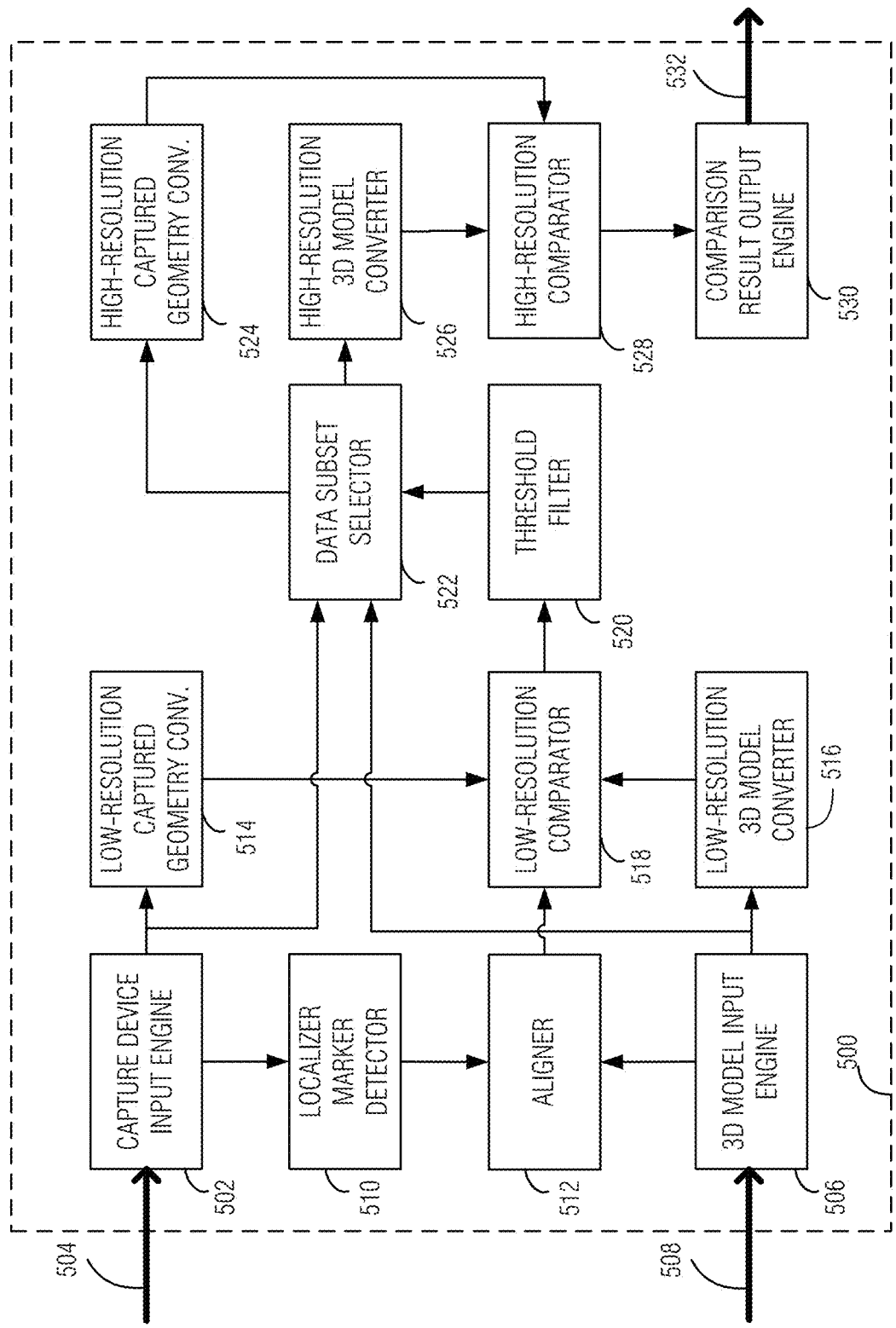
FIG. 5 is a block diagram illustrating various engines that may be implemented on a computing platform, according to an embodiment.

FIG. 5 is a block diagram illustrating various engines that may be implemented on a computing platform to carry out the comparison system according to one type of embodiment. System 500 includes capture device input engine 502 to access 3D captured data 504 provided by capture device 106 (FIG. 1). Capture device input engine 502 may include a communication interface (e.g., serial port, wireless link in a personal area network (PAN) such as Bluetooth, for instance, a wireless local area network (WLAN) connection, or the like, as well as device drivers, storage device(s), file system, and other components to effect the operations of accessing the 3D captured data 504. 3D model input engine 506 includes an interface to access 3D model data 508 provided via 3D model 104 (FIG. 1). In an embodiment where the 3D model 104 is stored locally as a database, 3D model input engine 506 may include program instructions (to be executed on a processor) to read the database. In an embodiment where 3D model 104 is stored remotely, 3D model input engine 506 may include suitable communication facilities to communicate with the remote-storage machine.

In a related embodiment, system 500 includes a localizer marker detector 510, and aligner 512, that uses localizer marker detector 510 to align the 3D model data 508 with the captured data 504. Low-resolution captured geometry converter 514 and low-resolution 3D model converter 516 are each specifically configured to produce low-resolution versions of their respective input data. For instance, as will be described in greater detail below, the low-resolution representations may be based on solid volume elements, such as voxels, and may be down-sampled relative to the resolution of the captured 3D geometry and 3D model. Working with the low-resolution, or coarse, representations is computationally more efficient than working with a higher-resolution representation of each corresponding set of data. Also, conversion to a similar format facilitates comparison between the two sets of data.

Low-resolution comparator 518 compares the two coarse data sets. Threshold filter 520 identifies only those differences that exceed a defined threshold. Accordingly, minor differences are to be disregarded. Data subset selector 522 selects portions of the 3D captured data 504 and the 3D model data 508 on which to perform fine-granularity comparison. The data subset selection is based on the threshold-filtered set of differences between the coarse data representations.

High-resolution captured geometry converter 524, and high-resolution 3D model converter 528 each process their respective selected data subsets to produce a fine representation thereof. For example, polygon-mesh representations may be produced, and provided to high-resolution comparator 528 to perform the fine-grain comparison. Operation of the high-resolution captured geometry converter 524, high-resolution 3D model converter 526, and high-resolution comparator 528 may be repeated for each selected data subset of the input data sets that was identified as having a significant coarse difference by operation of low-resolution comparator 518 and threshold filter 520.

Comparison result output engine 530 collects each processed fine-grain difference assessment, and prepares a suitable presentation of the results. This may be in a report format that graphically illustrates the as-designed version of the 3D model, the as-built version of the actual subject (as captured), and the detected differences therebetween. Output 532 may be provided to a GUI implemented on computing platform 110, and may be saved as a file for future reference, for example.

System 500 may detect differences such as dimensional or positioning errors of certain structural or other physical features. For example, a pipe or electrical box may be offset from its intended position. These types of construction errors may impact the overall project, particularly if they are not detected and corrected before further construction and equipment installation takes place. Later-stage correction may be very costly and time-intensive. Notably, the two-stage coarse-fine operation limits the amount of processing that computing platform 110 is tasked with. In particular, reducing the amount of high-resolution (fine grain) processing, provides significant improvement in overall speed of execution of the system. Accordingly, large, complex designs/constructions may be analyzed in the field, in real-time, or near-real-time. This performance improvement offers the ability of the assessor to examine individual detected differences, re-measure those locations, etc. Importantly, fast detection of the differences may enable the site owner to have errors addressed by the builder within the time limits specified by the applicable contracts.

Figure 6:
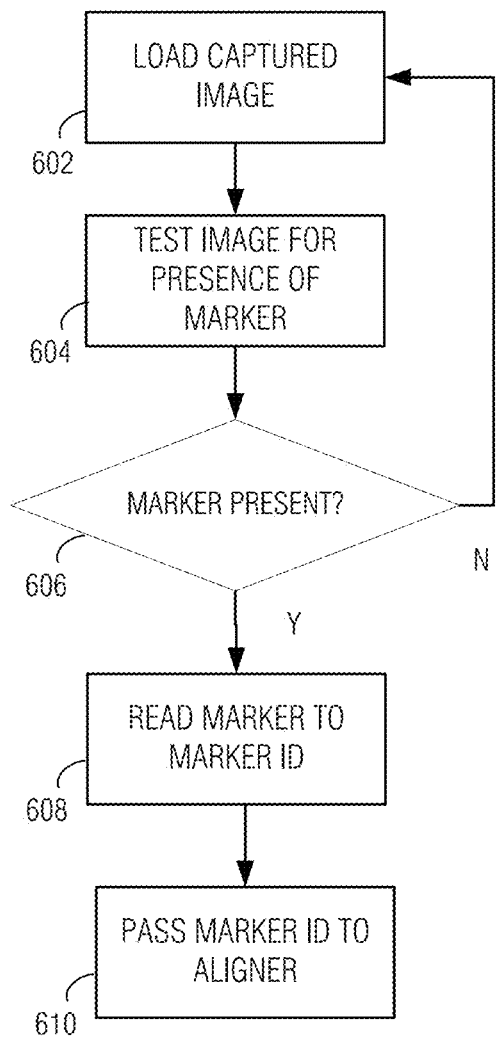
FIG. 6 is a process flow diagram illustrating an example operation that a localizer marker detector is configured to execute according to an embodiment.

FIG. 6 is a process flow diagram illustrating an example operation that localizer marker detector 510 is configured to execute according to an embodiment. A marker may be a uniquely-identifiable image, such as a quick-response (QR) code, which may be printed on a label to be placed at a specific location in, or on, the subject. A representation of the marker is similarly placed in the 3D model. The 3D positions of the markers may be user-defined in a meta-data file accompanying the 3D model, with the orientation derived from the 3D model itself, by querying the 3D position of the marker against the geometry contained within the 3D model. Additionally, the 3D position and orientation properties of a marker may be defined in the geometries and meta-data of the 3D model and read back for a specific marker when identified.

At 602, a captured image from capture device 106 is loaded. The captured image may be a still image or frame from a video stream. At 604, the captured image is tested for the presence of a marker. This operation may involve analysis of a raster image to test for a general pattern of varying contrast, for example, that may correspond to a QR code. If a marker is present, decision 606 advances the process to 608, where the marker is read to determine its unique identification, which in turn is passed, at 610, to aligner 512. If no marker is present in the current image, decision 606 branches the process flow to 602, where the next image or video frame is loaded.

Figure 7:
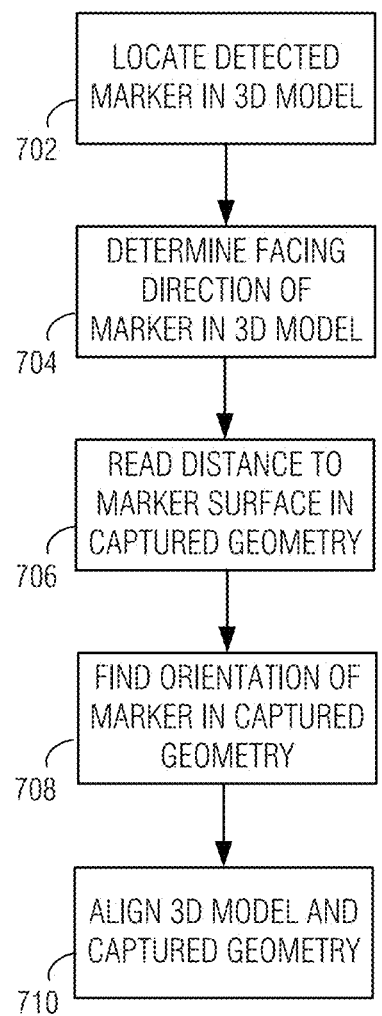
FIG. 7 is a flow diagram illustrating a process of operation of an aligner according to an example embodiment.

FIG. 7 is a flow diagram illustrating a process of operation of aligner 512 according to an example embodiment. At 702, the unique marker detected by localizer marker detector 510 is located in the 3D model. The marker positions may be defined in a meta-data file that accompanies the virtual model. For example, this may be in the form of a comma-separated value (CSV) file, where the marker ID is specified, followed by the XYZ values of its 3D position.

At 704, aligner determines the facing direction of the modeled marker in the 3D model. When the 3D model is loaded, the markers that are defined in the meta-data file are also loaded. For each marker, a small radius (e.g., 0.5 cm) around the 3D position is queried against the polygonal elements (e.g., triangles) that constitute the 3D model. When a polygonal element is found to intersect this radius, the position is tested to determine if it lies in front of or behind the element. Only if the position lies in front of the element or on the plane of the element itself, will the triangle be considered as the intersection triangle, otherwise the process moves on to the next polygonal element in the list.

Once the intersection triangle has been determined, a rotation matrix that defines the marker orientation is calculated. The rotation matrix includes 3 axes vectors; the forward, up and right vectors. These vectors are orthogonal to one another.

In an example where the polygonal elements are triangles, the face-normal of the triangle is calculated using all three of its vertices and used as the forward vector. Using the forward vector, the other two vectors may be derived. Typically the markers are placed on walls, which means a forward vector that extends across the XZ ground plane. The up vector will then simply be the Y axis vector. If the forward vector is more positioned on the ground or ceiling, then the forward vector will run along the Y axis, meaning an up vector at a right angle across the XZ plane. Once the up vector has be derived, then the right vector may be calculated as the cross product between the up and forward vectors. These 3 vectors now make up the rotation matrix of the marker and define its orientation.

At 706, the distance to the marker from the vantage point of the capture device is determined. At 708, the orientation of the marker in the actual world space is computed. Once the world-space position and orientation of the marker is determined, the virtual vantage point position and orientation is calculated. The capture device-space default orientation has the forward axis going towards the viewer (−Z), with the right axis moving to the viewers left (−X) along with the up axis (+Y). This is multiplied with the marker world-space orientation and the marker pose capture device-space orientation, and then inverted to produce the world-space virtual capture device orientation. This is then used to transform the difference between the world-space position and marker pose camera-space position into the world-space virtual camera position. With these transformations performed, the virtual "camera" is aligned at 710 within the 3D model with a viewpoint that matches that of the real-world capture device and what it is viewing.

Figure 8:
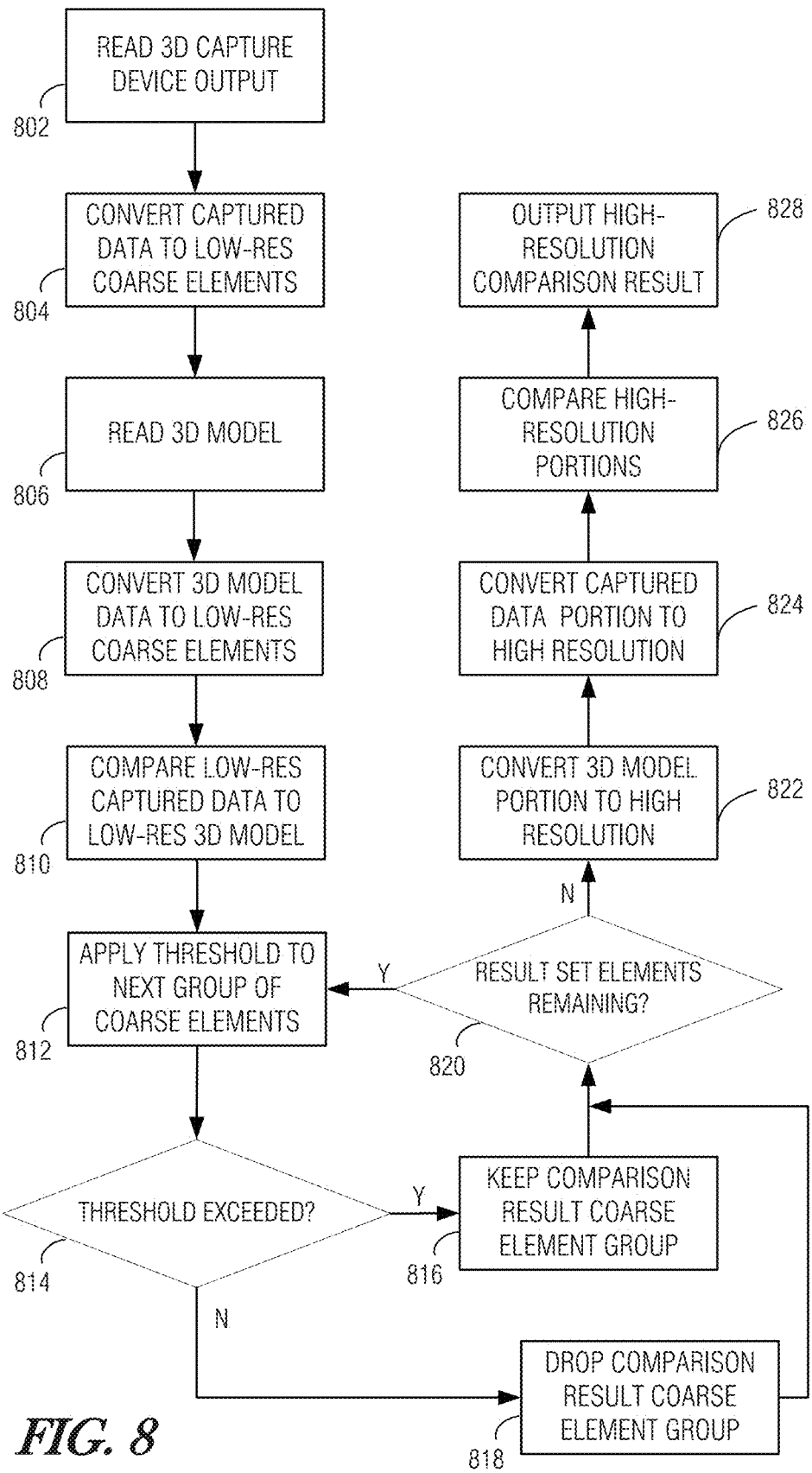
FIG. 8 is a diagram illustrating an overall system process flow according to an embodiment.
Figure 9A:
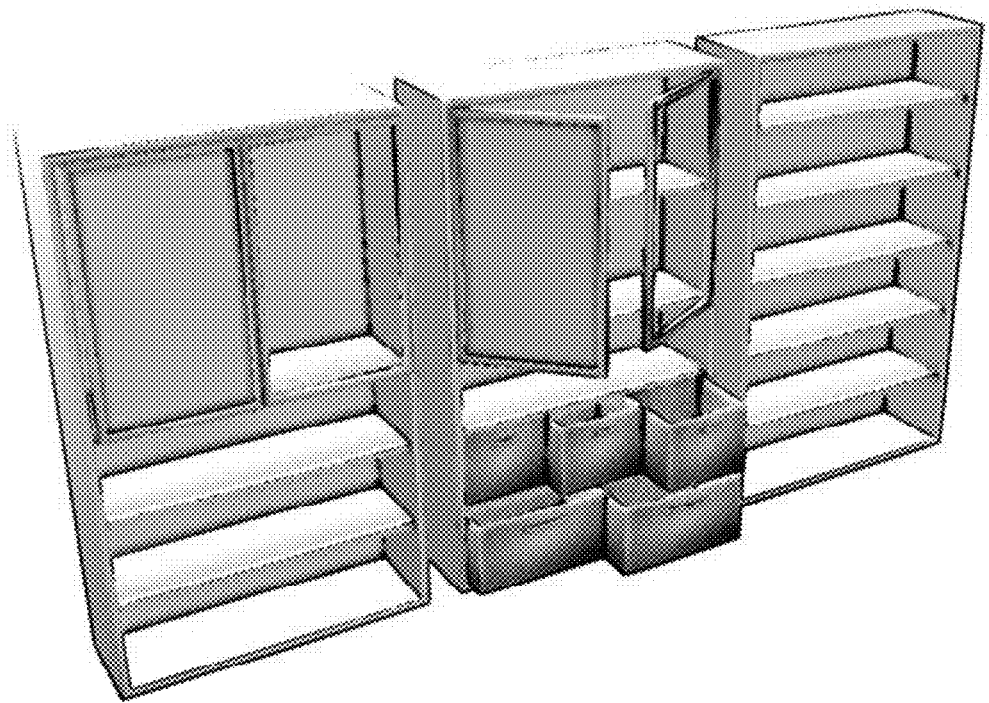
FIGS. 9A-9B illustrate "before" and "after" images, respectively, of the input and output of a low-resolution conversion operation according to an embodiment.
Figure 9B:
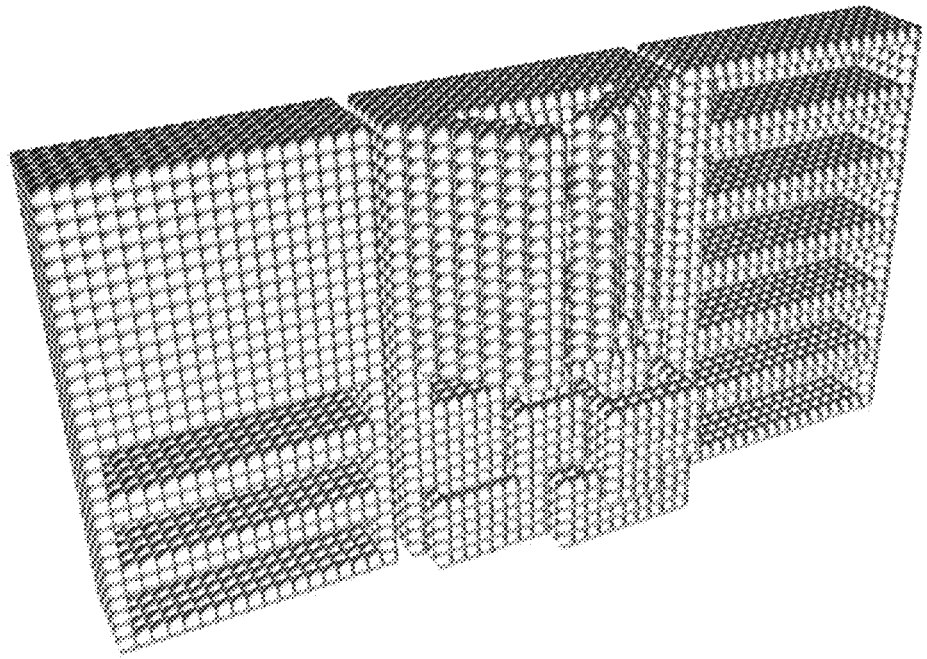

FIG. 8 is a diagram illustrating an overall system process flow according to an embodiment. At 802, the capture device output is read by input engine 502. At 804, low-resolution captured geometry converter 514 converts the captured data to a low-resolution representation using volume elements (e.g., voxels) according to an embodiment. FIGS. 9A-9B illustrate "before" and "after" images, respectively, of the input and output of a low-resolution conversion operation according to an embodiment. As depicted, the subject of FIG. 9A is converted to volume elements. Notably, the volume elements are substantially fewer in number than the point-cloud representation of the captured data or of the 3D model's native format. In other embodiments, a low-resolution surface-element representation may be used, such as a low-detail polygonal mesh, for example.

At 806, the 3D model is read by 3D model input engine 506. At 808 low-resolution 3D model converter 516 converts the 3D model to low-resolution elements. Notably, in an embodiment, the same (or similar) low-resolution format is used for the captured data and the 3D model. For instance, similar formats may be voxels for both, triangle-mesh for both, etc. In a related embodiment, the coarse element granularity is set to be similar if not identical for the captured data and 3D model.

At 810, the low-resolution comparison is performed by low-resolution comparator 518. In one such approach, low-resolution comparator 518 subtracts one data from another data set. Coarse elements that intersect are removed, but coarse elements not intersecting with the other data set remain as a comparison result.

At 812, threshold filter 520 is applied to the comparison result. In an embodiment, groupings of contiguous coarse elements remaining from the comparison are considered one at a time. The threshold filtering may be defined as a minimum-size difference along any dimension. For example, the threshold may be defined as 2 cm. Any difference in a grouping of coarse-comparison results that is not greater than the minimum size may be discarded. Accordingly, at decision 814, a test is made by threshold filter 520 if the threshold is exceeded. In the affirmative case, data subset selector 522 saves the coarse element group at 816 to be used for more detailed analysis. In the negative case, the small group of coarse elements is discarded at 818 by data subset selector 522. Data subset selector 522 applies decision 820 to check if coarse-comparison result set coarse elements remain. If so, the process loops to operation 812 to check a next group of coarse elements.

Otherwise, the process advances to 822, where portions of the 3D model are converted to the high-resolution (fine) representation by high-resolution 3D model converter 526. In one embodiment, only those portions that correspond to the comparison result coarse-element group produced at operation 816 are converted. In another embodiment, a larger set of data is converted, particularly at a pre-processing stage that may be performed in advance of the field measurements.

At 824, the captured data is converted to a high-resolution representation by high-resolution captured geometry converter 524. In one such embodiment, only regions of the captured data that correspond to the comparison result coarse-element group produced at operation 816 are converted to the high-resolution representation.

The high-resolution representations may be a polygonal-mesh representation according to one type of embodiment. For instance, the polygons may be triangles. In another type of embodiment, fine-grain volume-elements may be used for the high-resolution representation. In either case, the high-resolution representation utilizes smaller elements than the low-resolution representation. For instance, the fine elements may be at least an order of magnitude smaller than the coarse elements. In another related embodiment, the same type of high-resolution representation is used for the captured data and the 3D-model data.

At 826, high-resolution comparator 528 compares the high-resolution representations. The comparison may involve performing element-by-element subtraction operations, for instance. The comparison produces a set of differences represented at a fine granularity. At 828, comparison result output engine 530 formats the result of the high-resolution comparison as an output of the process. As discussed above, the output may be formatted into a report to be displayed or saved as a file, for example.

Figure 10:
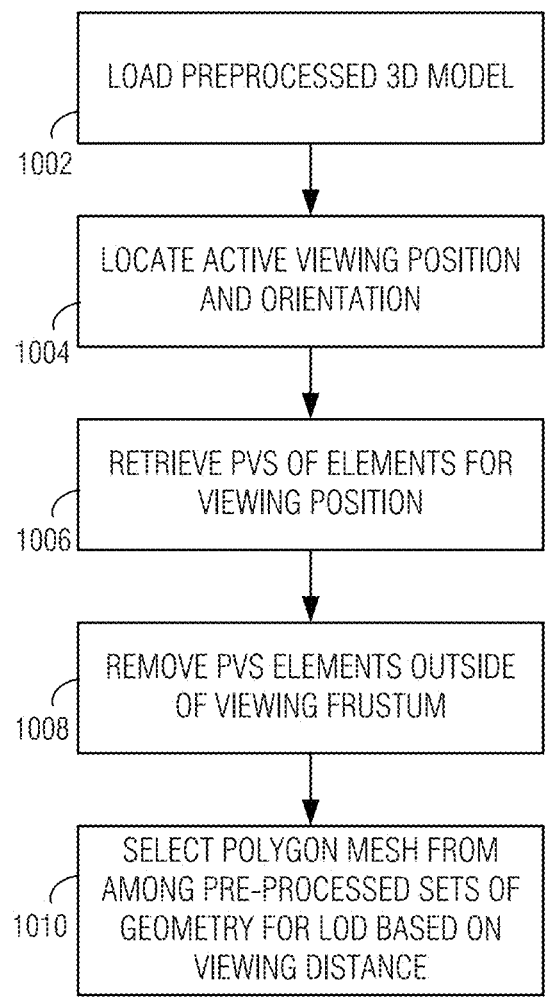
FIG. 10 is a flow diagram illustrating a process of selecting portions of a 3D model to use for high-resolution comparison according to an embodiment.
Figure 11:
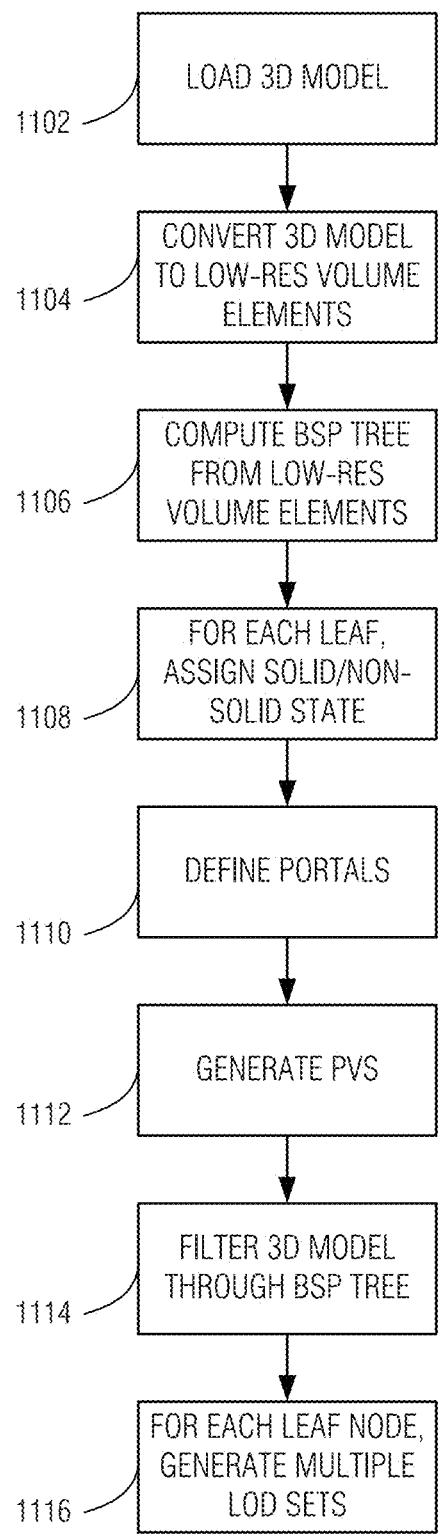
FIG. 11 is a flow diagram illustrating a method for preprocessing 3D model data according to one embodiment
Figure 12:
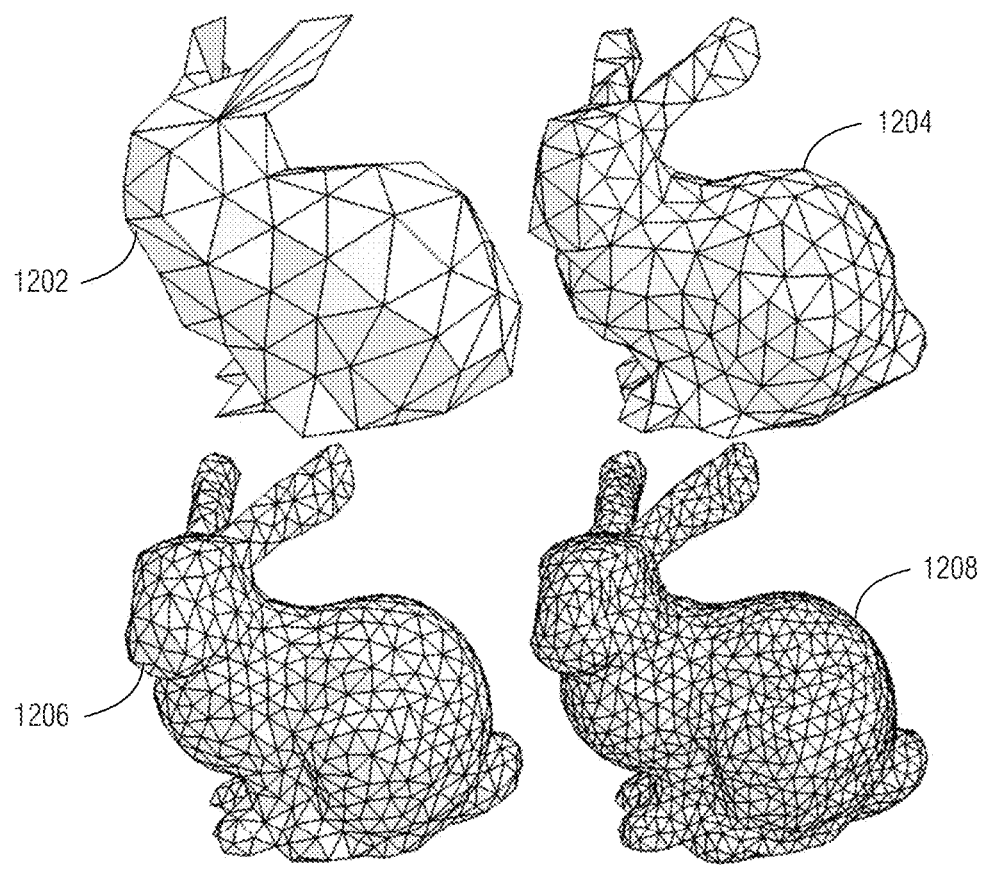
FIG. 12 is a diagram illustrating various levels of detail (LODs) in a triangle-mesh representation of a subject, which may be produced in the preprocessing according to some embodiments.

FIGS. 10-12 illustrate various details of operation 822 to convert the 3D model into the high-resolution representation according to some embodiments of high-resolution 3D model converter 526. FIG. 10 is a flow diagram illustrating a process of selecting portions of the 3D model to use for the high-resolution comparison at 826 according to an embodiment. At 1002, a preprocessed 3D model is loaded. Preprocessing operations are described in greater detail below. At 1004, the active viewing position and orientation are located in the 3D model. This operation determines the vantage point of the data capturing performed in the world space. For the determined viewing position, operation 1006 retrieves the potentially-viewable set (PVS) of fine-grain elements identified in the preprocessing. At 1008, a viewing frustum is positioned that represents the field of view of a portion of the 3D model from the vantage point, and PVS elements outside of the viewing frustum are removed. At 1010, the remaining high-resolution elements, e.g., polygon mesh elements are selected from among various levels of detail (LOD) produced in the preprocessing, based on the distance of the vantage point to the fine elements of interest falling within the viewing frustum. A closer vantage point will result in a selection of higher LOD, whereas a more distant vantage point will select lower-LOD representation. Advantageously, in this embodiment, the 3D model is represented at a LOD that generally corresponds to the LOD obtained from the data capture in the world space.

FIG. 11 is a flow diagram illustrating a method for preprocessing 3D model data according to an embodiment. At 1102, the 3D model is loaded. At 1104, the 3D model is converted to low-resolution volume elements, such as voxels, for example. At 1106, a binary space partitioning (BSP) tree data structure is built from the low-resolution volume elements. The BSP tree is then used to produce the PVS. In this embodiment, the BSP tree subdivides the 3D model into a number of nodes, and for any given node, only the other nodes to which the given node has line-of-sight visibility, may be added to its PVS, with the other, occluded, nodes being ignored. Later, at runtime, the view point will be within a certain node, and only the nodes contained within its PVS will be considered for rendering.

The BSP tree is a recursive subdivision of space that treats each voxel face hyperplane as a partitioning half-space. The tree taken as a whole represents the entire space, and each node in the tree represents a convex subspace. Each node stores a hyperplane which divides the space it represents into two halves, and references to two nodes which represent each half. When using voxels to drive the generation of the BSP tree, the splitting planes will be axis-aligned meaning a k-d tree is actually formed.

At 1108, for each leaf of the BSP tree, the node is assigned a solid/non-solid state.

At 1110, portals are created at the open spaces between non-solid leaf nodes. At 1112, a PVS is generated. For each leaf node, viewing frustums are constructed from the portal geometry of this leaf node, which are clipped against the portals of other leaf nodes as the tree is traversed, with only the leaf nodes that intersect the diminishing viewing frustum being added to the PVS of the current leaf node. The PVS may be compressed into a bit-array to conserve memory. This approach may utilize a 'solid-node' BSP, meaning that the end nodes may be defined as either solid or non-solid. Line-of-sight may succeed through a non-solid node, but fail when a solid node is encountered. This forces a requirement that the source geometry used to generate the BSP tree is convex or solid—non-manifold or polygon-soup geometry may not be used.

At 1114, the 3D model geometry is filtered through the BSP tree, clipping against node hyperplanes as necessary, until it is assigned into the end leaf nodes. Each leaf node ends up with its own self-contained geometry. This geometry may then be processed to simplify the complexity and lower the triangle count, while endeavoring to maintain the overall geometric look and shape.

At 1116, a number of levels of detail are created, with each stepping down the detail that is retained. FIG. 12 is a diagram illustrating various levels of detail (LODs) in a triangle-mesh representation of a subject, which may be produced in the preprocessing according to some embodiments. Increasing LOD is seen at representations 1202, 1204, 1206, and 1208. At runtime, if the viewer is close to the leaf node, then a LOD will be selected that includes more detail whereas if the leaf node is further away, the LOD selected will contain less detail that is computationally cheaper to process.

FIGS. 6-8 and 10-11, are flow diagrams illustrating example processing operations according to various embodiments. It is important to note that the example processes are richly-featured embodiments that may be realized as described; in addition, portions of the processes may be implemented while others are excluded in various embodiments. The following Additional Notes and Examples section details various combinations, without limitation, that are contemplated. It should also be noted that in various embodiments, certain process operations may be performed in a different ordering than depicted, provided that the logical flow and integrity of the process is not disrupted in substance.

ADDITIONAL NOTES & EXAMPLES

Example 1 is a system for comparing an actual subject and a computed 3D model of the subject, the system comprising a computing platform to implement: a capture device input engine to access captured geometry of the actual subject, and a 3D model input engine to access the 3D model; a low-resolution comparator operatively coupled to the capture device input engine and to the 3D model input engine, the low-resolution comparator to compute a first comparison result representing a difference between coarse representations of the captured geometry and of the 3D model; a threshold filter operatively coupled to the low-resolution comparator, the threshold filter to determine target portions of the first comparison result that exceed a threshold; and a high-resolution comparator operatively coupled to the threshold filter, the high-resolution comparator to compute a second comparison result representing a difference between fine representations of the captured geometry and the 3D model, wherein the second comparison result is computed for only those portions of the captured geometry and the 3D model that correspond to the target portions of the first comparison result.

In Example 2, the subject matter of Example 1 optionally includes wherein the fine representations include only those portions of the captured geometry and the 3D model that correspond to the target portions of the first comparison result.

In Example 3, the subject matter of any one or more of Examples 1-2 optionally include wherein the coarse representation of each of the captured geometry and the 3D model is a volume-element representation.

In Example 4, the subject matter of any one or more of Examples 1-3 optionally include wherein the fine representation of each of the captured geometry and the 3D model is a polygon-mesh representation.

In Example 5, the subject matter of any one or more of Examples 1-4 optionally include wherein the captured geometry of the actual subject accessed by the capture device input is a point-cloud representation of distance to surfaces corresponding to captured imagery.

In Example 6, the subject matter of any one or more of Examples 1-5 optionally include an aligner to align the captured geometry of the actual subject and the 3D model based on an actual marker positioned at the actual subject and a corresponding marker indicator positioned in the 3D model.

In Example 7, the subject matter of Example 6 optionally includes a marker detector to process captured imagery of the actual marker to determine a presence and identification of the actual marker.

In Example 8, the subject matter of any one or more of Examples 6-7 optionally include wherein the actual marker includes a quick-response code.

In Example 9, the subject matter of any one or more of Examples 6-8 optionally include wherein the aligner is to determine a distance and an orientation of the actual marker from a vantage point of the capture device based on a captured image of the actual marker.

In Example 10, the subject matter of any one or more of Examples 1-9 optionally include a low-resolution captured geometry converter to generate a coarse representation of the captured geometry, and a low-resolution 3D model converter to generate a coarse representation of the 3D model.

In Example 11, the subject matter of any one or more of Examples 1-10 optionally include a high-resolution captured geometry converter to generate a fine representation of the captured geometry, and a high-resolution 3D model converter to generate a fine representation of the 3D model.

In Example 12, the subject matter of Example 11 optionally includes wherein the high-resolution 3D model converter is to preprocess a plurality of different level-of-detail sets of representations of portions of the 3D model, and to select from among the different level-of-detail representations for a given portion of the 3D model based on viewing distance of that portion.

In Example 13, the subject matter of any one or more of Examples 11-12 optionally include wherein the high-resolution 3D model converter is to exclude portions of the 3D model from conversion to high resolution that are not visible within a viewing frustum.

In Example 14, the subject matter of any one or more of Examples 11-13 optionally include wherein the high-resolution 3D model converter is to exclude portions of the 3D model from conversion to high resolution that are obscured by solid material based on vantage points from other portions of the 3D model.

Example 15 is a computer-readable medium containing instructions that, when executed on a computing platform, cause the computing platform to perform operations comprising: accessing captured geometry of the actual subject; accessing the 3D model; computing a first comparison result representing a difference between coarse representations of the captured geometry and of the 3D model; determining target portions of the first comparison result that exceed a threshold; and computing a second comparison result representing a difference between fine representations of the captured geometry and the 3D model, wherein the second comparison result is computed for only those portions of the captured geometry and the 3D model that correspond to the target portions of the first comparison result.

In Example 16, the subject matter of Example 15 optionally includes wherein the fine representations include only those portions of the captured geometry and the 3D model that correspond to the target portions of the first comparison result.

In Example 17, the subject matter of any one or more of Examples 15-16 optionally include wherein the coarse representation of each of the captured geometry and the 3D model is a volume-element representation.

In Example 18, the subject matter of any one or more of Examples 15-17 optionally include wherein the fine representation of each of the captured geometry and the 3D model is a polygon-mesh representation.

In Example 19, the subject matter of any one or more of Examples 15-18 optionally include wherein the captured geometry of the actual subject is a point-cloud representation of distance to surfaces corresponding to captured imagery.

In Example 20, the subject matter of any one or more of Examples 15-19 optionally include instructions for causing the computing platform to perform aligning the captured geometry of the actual subject and the 3D model based on an actual marker positioned at the actual subject and a corresponding marker indicator positioned in the 3D model.

In Example 21, the subject matter of Example 20 optionally includes instructions for causing the computing platform to perform processing captured imagery of the actual marker to determine a presence and identification of the actual marker.

In Example 22, the subject matter of any one or more of Examples 20-21 optionally include wherein the actual marker includes a quick-response code.

In Example 23, the subject matter of any one or more of Examples 20-22 optionally include wherein the aligning includes determining a distance and an orientation of the actual marker from a vantage point from which the captured geometry of the actual subject was captured, based on a captured image of the actual marker.

In Example 24, the subject matter of any one or more of Examples 15-23 optionally include instructions for causing the computing platform to perform generating a coarse representation of the captured geometry; and instructions for causing the computing platform to perform generating a coarse representation of the 3D model.

In Example 25, the subject matter of Example 24 optionally includes instructions for causing the computing platform to perform generating a fine representation of the captured geometry; and instructions for causing the computing platform to perform generating a fine representation of the 3D model.

In Example 26, the subject matter of Example 25 optionally includes wherein generating the fine representation of the 3D model includes preprocessing a plurality of different level-of-detail sets of representations of portions of the 3D model, and selecting a specific level-of-detail set from among the different level-of-detail representations for a given portion of the 3D model based on viewing distance of that portion.

In Example 27, the subject matter of any one or more of Examples 25-26 optionally include wherein generating the fine representation of the 3D model includes omitting portions of the 3D model from conversion to high resolution that are not visible within a viewing frustum.

In Example 28, the subject matter of any one or more of Examples 25-27 optionally include wherein generating the fine representation of the 3D model includes omitting portions of the 3D model from conversion to high resolution that are obscured by solid material based on vantage points from other portions of the 3D model.

Example 29 is a method for comparing an actual subject and a computed 3D model of the subject, the method being executed by a computing platform, and comprising: accessing captured geometry of the actual subject; accessing the 3D model; computing a first comparison result representing a difference between coarse representations of the captured geometry and of the 3D model; determining target portions of the first comparison result that exceed a threshold; and computing a second comparison result representing a difference between fine representations of the captured geometry and the 3D model, wherein the second comparison result is computed for only those portions of the captured geometry and the 3D model that correspond to the target portions of the first comparison result.

In Example 30, the subject matter of Example 29 optionally includes wherein the fine representations include only those portions of the captured geometry and the 3D model that correspond to the target portions of the first comparison result.

In Example 31, the subject matter of any one or more of Examples 29-30 optionally include wherein the coarse representation of each of the captured geometry and the 3D model is a volume-element representation.

In Example 32, the subject matter of any one or more of Examples 29-31 optionally include wherein the fine representation of each of the captured geometry and the 3D model is a polygon-mesh representation.

In Example 33, the subject matter of any one or more of Examples 29-32 optionally include wherein the captured geometry of the actual subject is a point-cloud representation of distance to surfaces corresponding to captured imagery.

In Example 34, the subject matter of any one or more of Examples 29-33 optionally include aligning the captured geometry of the actual subject and the 3D model based on an actual marker positioned at the actual subject and a corresponding marker indicator positioned in the 3D model.

In Example 35, the subject matter of Example 34 optionally includes processing captured imagery of the actual marker to determine a presence and identification of the actual marker.

In Example 36, the subject matter of any one or more of Examples 34-35 optionally include wherein the actual marker includes a quick-response code.

In Example 37, the subject matter of any one or more of Examples 34-36 optionally include wherein the aligning includes determining a distance and an orientation of the actual marker from a vantage point from which the captured geometry of the actual subject was captured, based on a captured image of the actual marker.

In Example 38, the subject matter of any one or more of Examples 29-37 optionally include generating a coarse representation of the captured geometry; and generating a coarse representation of the 3D model.

In Example 39, the subject matter of Example 38 optionally includes generating a fine representation of the captured geometry; and generating a fine representation of the 3D model.

In Example 40, the subject matter of Example 39 optionally includes wherein generating the fine representation of the 3D model includes preprocessing a plurality of different level-of-detail sets of representations of portions of the 3D model, and selecting a specific level-of-detail set from among the different level-of-detail representations for a given portion of the 3D model based on viewing distance of that portion.

In Example 41, the subject matter of any one or more of Examples 39-40 optionally include wherein generating the fine representation of the 3D model includes omitting portions of the 3D model from conversion to high resolution that are not visible within a viewing frustum.

In Example 42, the subject matter of any one or more of Examples 39-41 optionally include wherein generating the fine representation of the 3D model includes omitting portions of the 3D model from conversion to high resolution that are obscured by solid material based on vantage points from other portions of the 3D model.

Example 43 is a system for comparing an actual subject and a computed 3D model of the subject, the system comprising: means for accessing captured geometry of the actual subject; means for accessing the 3D model; means for computing a first comparison result representing a difference between coarse representations of the captured geometry and of the 3D model; means for determining target portions of the first comparison result that exceed a threshold; and means for computing a second comparison result representing a difference between fine representations of the captured geometry and the 3D model, wherein the second comparison result is computed for only those portions of the captured geometry and the 3D model that correspond to the target portions of the first comparison result.

In Example 44, the subject matter of Example 43 optionally includes wherein the fine representations include only those portions of the captured geometry and the 3D model that correspond to the target portions of the first comparison result.

In Example 45, the subject matter of any one or more of Examples 43-44 optionally include wherein the coarse representation of each of the captured geometry and the 3D model is a volume-element representation.

In Example 46, the subject matter of any one or more of Examples 43-45 optionally include wherein the fine representation of each of the captured geometry and the 3D model is a polygon-mesh representation.

In Example 47, the subject matter of any one or more of Examples 43-46 optionally include wherein the captured geometry of the actual subject is a point-cloud representation of distance to surfaces corresponding to captured imagery.

In Example 48, the subject matter of any one or more of Examples 43-47 optionally include means for aligning the captured geometry of the actual subject and the 3D model based on an actual marker positioned at the actual subject and a corresponding marker indicator positioned in the 3D model.

In Example 49, the subject matter of Example 48 optionally includes means for processing captured imagery of the actual marker to determine a presence and identification of the actual marker.

In Example 50, the subject matter of any one or more of Examples 48-49 optionally include wherein the actual marker includes a quick-response code.

In Example 51, the subject matter of any one or more of Examples 48-50 optionally include wherein the means for aligning include means for determining a distance and an orientation of the actual marker from a vantage point from which the captured geometry of the actual subject was captured, based on a captured image of the actual marker.

In Example 52, the subject matter of any one or more of Examples 43-51 optionally include means for generating a coarse representation of the captured geometry; and means for generating a coarse representation of the 3D model.

In Example 53, the subject matter of Example 52 optionally includes means for generating a fine representation of the captured geometry; and means for generating a fine representation of the 3D model.

In Example 54, the subject matter of Example 53 optionally includes wherein the means for generating the fine representation of the 3D model includes means for preprocessing a plurality of different level-of-detail sets of representations of portions of the 3D model, and means for selecting a specific level-of-detail set from among the different level-of-detail representations for a given portion of the 3D model based on viewing distance of that portion.

In Example 55, the subject matter of any one or more of Examples 53-54 optionally include wherein the means for generating the fine representation of the 3D model includes means for omitting portions of the 3D model from conversion to high resolution that are not visible within a viewing frustum.

In Example 56, the subject matter of any one or more of Examples 53-55 optionally include wherein the means for generating the fine representation of the 3D model includes means for omitting portions of the 3D model from conversion to high resolution that are obscured by solid material based on vantage points from other portions of the 3D model.

Example 57 is a computer-readable medium containing instructions that, when executed on a computing platform, cause the computing platform to carry out the method according to any one of Examples 29-42.

Example 58 is a system for comparing an actual subject and a computed 3D model of the subject, the system comprising means for carrying out the method according to any one of Examples 29-42.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for comparing an actual instance of a subject and a computed 3D model of the subject, the system comprising a computing platform to implement:
    a capture device input engine to access captured geometry of the actual instance of the subject, and a 3D model input engine to access the 3D model, the 3D model representing an as-designed model of the subject and pre-computed for comparison to the captured geometry of the actual instance of the subject;
    a low-resolution comparator operatively coupled to the capture device input engine and to the 3D model input engine, the low-resolution comparator to compute a first comparison result representing a difference between coarse representations of the captured geometry and of the 3D model;
    a threshold filter operatively coupled to the low-resolution comparator, the threshold filter to determine target portions of the first comparison result that exceed a threshold difference between coarse representations of the captured geometry and of the 3D model; and
    a high-resolution comparator operatively coupled to the threshold filter, the high-resolution comparator to compute a second comparison result representing a difference between fine representations of the captured geometry and a high-resolution representation of the 3D model, wherein only portions of the 3D model that correspond to the target portions of the first comparison result are converted to the high-resolution of the 3D model, and wherein the second comparison result is computed for only those portions of the captured geometry and the high-resolution representation of the 3D model that correspond to the target portions of the first comparison result.

2. The system of claim 1, wherein the fine representations include only those portions of the captured geometry and the 3D model that correspond to the target portions of the first comparison result.

3. The system of claim 1, wherein the coarse representation of each of the captured geometry and the 3D model is a volume-element representation.

4. The system of claim 1, wherein the fine representation of each of the captured geometry and the 3D model is a polygon-mesh representation.

5. The system of claim 1 wherein the captured geometry of the actual instance of the subject accessed by the capture device input is a point-cloud representation of distance to surfaces corresponding to captured imagery.

6. The system of claim 1, further comprising:
    an aligner to align the captured geometry of the actual instance of the subject and the 3D model based on an actual marker positioned at the actual instance of the subject and a corresponding marker indicator positioned in the 3D model.

7. The system of claim 6, further comprising:
a marker detector to process captured imagery of the actual marker to determine a presence and identification of the actual marker.

8. The system of claim 6, wherein the actual marker includes a quick-response code.

9. The system of claim 6, wherein the aligner is to determine a distance and an orientation of the actual marker from a vantage point of the capture device based on a captured image of the actual marker.

10. The system of claim 1, further comprising:
a low-resolution captured geometry converter to generate a coarse representation of the captured geometry, and a low-resolution 3D model converter to generate a coarse representation of the 3D model.

11. The system of claim 1, further comprising:
a high-resolution captured geometry converter to generate a fine representation of the captured geometry, and a high-resolution 3D model converter to generate a fine representation of the 3D model.

12. The system of claim 11, wherein the high-resolution 3D model converter is to preprocess a plurality of different level-of-detail sets of representations of portions of the 3D model, and to select from among the different level-of-detail representations for a given portion of the 3D model based on viewing distance of that portion.

13. The system of claim 11, wherein the high-resolution 3D model converter is to exclude portions of the 3D model from conversion to high resolution that are not visible within a viewing frustum.

14. The system of claim 11, wherein the high-resolution 3D model converter is to exclude portions of the 3D model from conversion to high resolution that are obscured by solid material based on vantage points from other portions of the 3D model.

15. A non-transitory computer-readable medium containing instructions for comparing an actual instance of a subject and a computed 3D model of the subject, which when executed on a computing platform, cause the computing platform to perform operations comprising:
accessing captured geometry of the actual instance of the subject;
accessing the 3D model, the 3D model representing an as-designed model of the subject and pre-computed for comparison to the captured geometry of the actual instance of the subject;
computing a first comparison result representing a difference between coarse representations of the captured geometry and of the 3D model;
determining target portions of the first comparison result that exceed a threshold; and
computing a second comparison result representing a difference between fine representations of the captured geometry and a high-resolution representation of the 3D model, wherein only portion of the 3D model that correspond to the target portions of the first comparison result are converted to the high-resolution of the 3D model, and wherein the second comparison result is computed for only those portions of the captured geometry and the high-resolution representation of the 3D model that correspond to the target portions of the first comparison result.

16. The non-transitory computer-readable medium of claim 15, further comprising:
instructions for causing the computing platform to perform aligning the captured geometry of the actual instance of the subject and the 3D model based on an actual marker positioned at the actual instance of the subject and a corresponding marker indicator positioned in the 3D model.

17. The non-transitory computer-readable medium of claim 16, wherein the aligning includes determining a distance and an orientation of the actual marker from a vantage point from which the captured geometry of the actual instance of the subject was captured, based on a captured image of the actual marker.

18. The non-transitory computer-readable medium of claim 15, further comprising:
instructions for causing the computing platform to perform generating a coarse representation of the captured geometry; and
instructions for causing the computing platform to perform generating a coarse representation of the 3D model.

19. The non-transitory computer-readable medium of claim 18, further comprising:
instructions for causing the computing platform to perform generating a fine representation of the captured geometry; and
instructions for causing the computing platform to perform generating a fine representation of the 3D model.

20. The non-transitory computer-readable medium of claim 19, wherein generating the fine representation of the 3D model includes preprocessing a plurality of different level-of-detail sets of representations of portions of the 3D model, and selecting a specific level-of-detail set from among the different level-of-detail representations for a given portion of the 3D model based on viewing distance of that portion.

21. A method for comparing an actual instance of a subject and a computed 3D model of the subject, the method being executed by a computing platform, and comprising:
accessing captured geometry of the actual instance of the subject;
accessing the 3D model, the 3D model representing an as-designed model of the subject and pre-computed for comparison to the captured geometry of the actual instance of the subject;
computing a first comparison result representing a difference between coarse representations of the captured geometry and of the 3D model;
determining target portions of the first comparison result that exceed a threshold; and
computing a second comparison result representing a difference between fine representations of the captured geometry and a high-resolution representation of the 3D model, wherein only portion of the 3D model that correspond to the target portions of the first comparison result are converted to the high-resolution of the 3D model, and wherein the second comparison result is computed for only those portions of the captured geometry and the high-resolution representation of the 3D model that correspond to the target portions of the first comparison result.

22. The method of claim 21, further comprising:
aligning the captured geometry of the actual instance of the subject and the 3D model based on an actual marker positioned at the actual instance of the subject and a corresponding marker indicator positioned in the 3D model.

23. The method of claim 21, further comprising:
generating a coarse representation of the captured geometry; and
generating a coarse representation of the 3D model.

24. The method of claim 23, further comprising:
generating a fine representation of the captured geometry; and
generating a fine representation of the 3D model.

25. The method of claim 24, wherein generating the fine representation of the 3D model includes preprocessing a plurality of different level-of-detail sets of representations of portions of the 3D model, and selecting a specific level-of-detail set from among the different level-of-detail representations for a given portion of the 3D model based on viewing distance of that portion.

* * * * *